Aug. 30, 1927.  1,640,987
C. H. GRAY
MANUFACTURE OF HOLLOW ARTICLES OF RUBBER
Filed Sept. 9, 1924   2 Sheets-Sheet 1
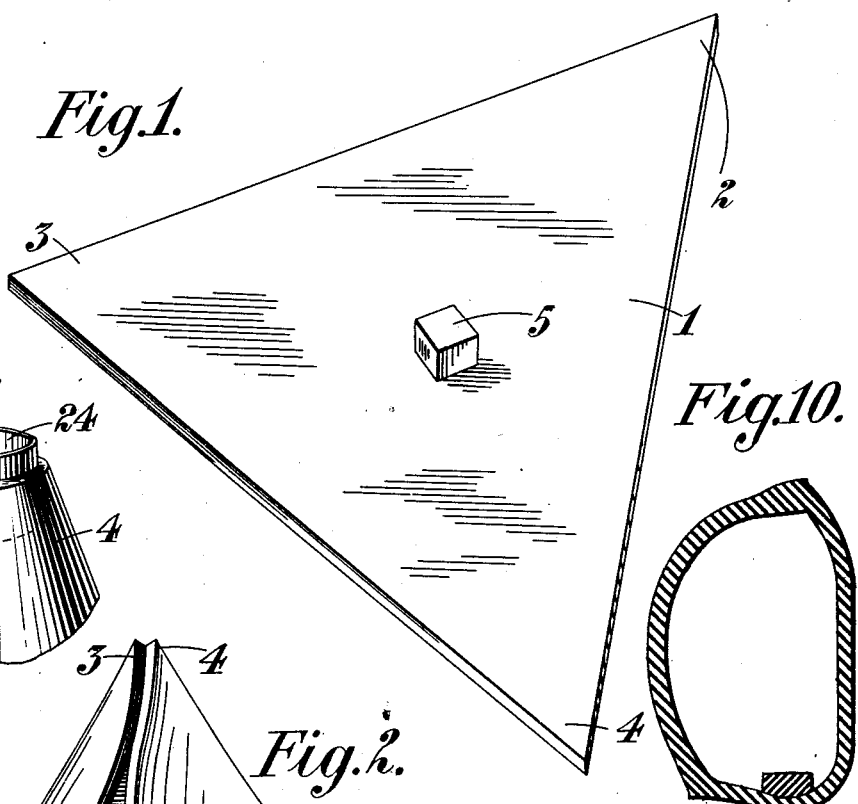
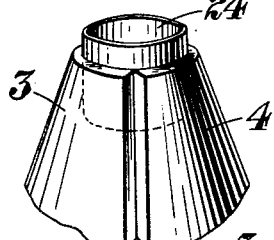
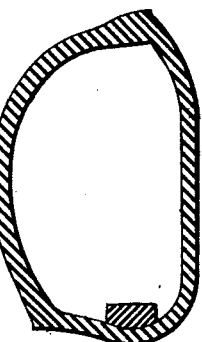
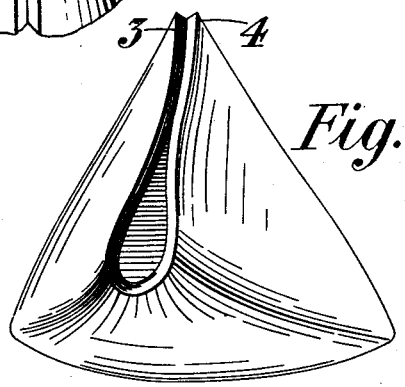
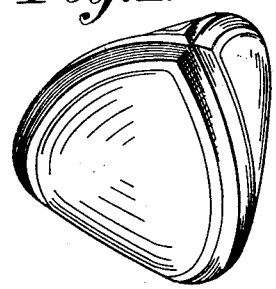
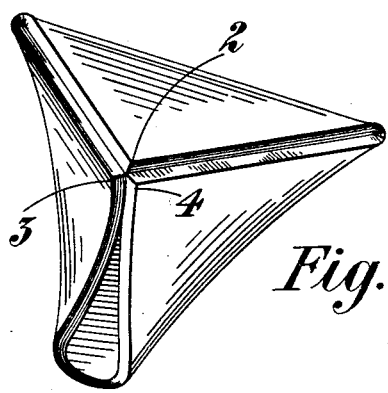

Aug. 30, 1927. 1,640,987
C. H. GRAY
MANUFACTURE OF HOLLOW ARTICLES OF RUBBER
Filed Sept. 9, 1924 2 Sheets-Sheet 2
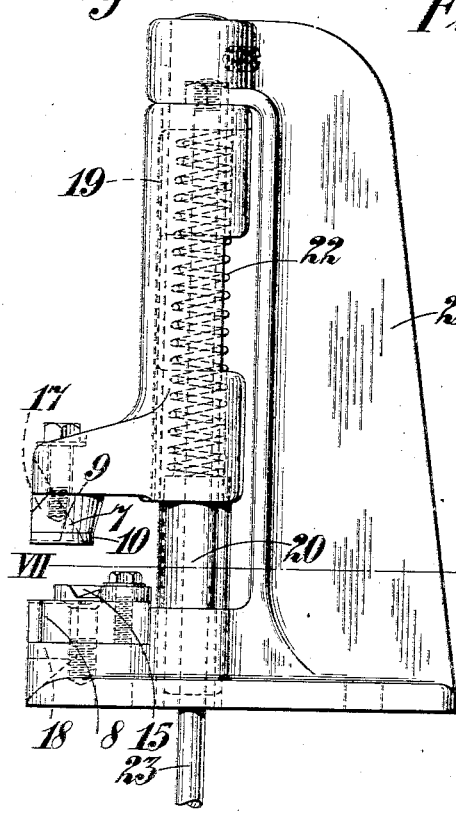
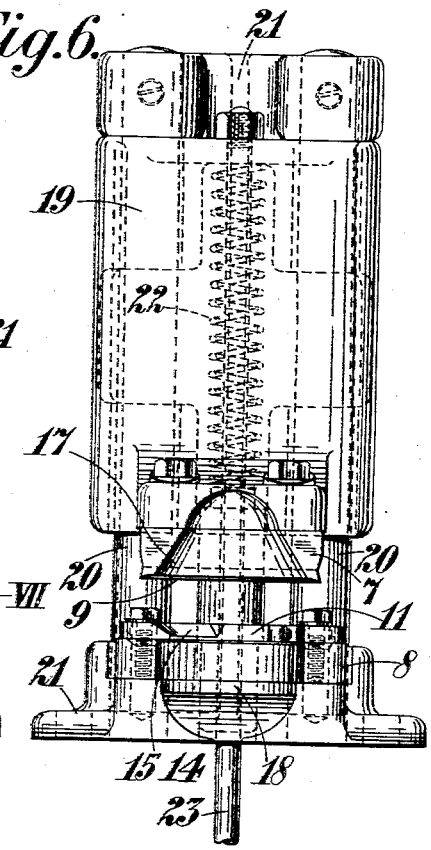
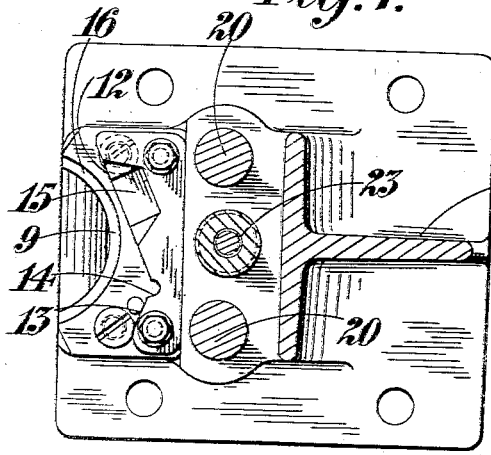
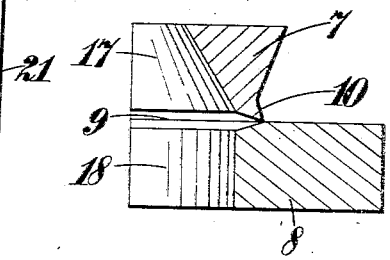

Patented Aug. 30, 1927.

1,640,987

UNITED STATES PATENT OFFICE.

CHRISTIAN HAMILTON GRAY, OF LONDON, ENGLAND.

MANUFACTURE OF HOLLOW ARTICLES OF RUBBER.

Application filed September 9, 1924, Serial No. 736,740, and in Great Britain November 15, 1923.

This invention relates to a method of and apparatus for making hollow blanks for use in the manufacture of hollow articles of rubber, such for instance as tennis-balls.

It has heretofore been proposed to fold a square sheet of unvulcanized rubber by a machine having four petals into the form of a hollow pyramidal blank for use in the manufacture of balls, but difficulties were experienced in making a satisfactory joint at the apex of the blank. Such a piece of stock having four corners cannot be folded by hand to form a pyramidal hollow blank because when the corners are brought together a flat structure having two thicknesses of material results. Also, when a square sheet of stock is used in the machine there is a considerable amount of waste.

This invention has for its main object to obviate these difficulties and to ensure that the sheet of rubber stock is not cut to waste.

The method according to this invention comprises bringing the corners of a triangular piece of rubber together over the central portion and causing the contiguous edges thereof to adhere together, (for example in such manner as to effect a fluid-tight seal) to form a closed hollow blank of pyramidal form.

The method according to this invention also comprises bringing the corners of a triangular piece of rubber together over the central portion, biting away portions of the contiguous edges thereof in such manner as to leave the edges with the desired contour according to the article to be formed, and causing the contiguous shaped edges to adhere together to form a closed hollow blank.

Other features of the invention, including the apparatus for performing the biting operation, will be hereinafter described and pointed out in the claims.

In the accompanying drawings—

Figure 1 shows the triangular piece of rubber for forming the blank;

Figure 2 is a side elevation showing the corners of the piece turned up to form a partly-closed blank of pyramidal form;

Figure 3 is a plan of the blank shown in Figure 2;

Figure 4 shows the completed blank after the edges have been cut and sealed;

Figure 5 is a side elevation of a cutting and pressing machine according to this invention;

Figure 6 is a front elevation thereof;

Figure 7 is a sectional plan on the line 7—7 of Figure 5;

Figure 8 is a detailed sectional view showing the cutting jaws; and

Figure 9 shows the top portion of a blank with a sleeve inserted;

Figure 10 is a sectional view taken through a blank through an apex showing the increased width of the adherent faces.

The drawings and the following description refer to the manufacture of blanks for spherical balls although it will be understood that the invention is applicable to the formation of blanks for other hollow articles such as motor-horn bulbs and the like.

From a sheet of unvulcanized rubber stock, a piece 1 (see Figure 1) of equilateral triangular shape and of a suitable size is taken and the corners 2, 3 and 4 are brought together over the central portion. The piece 1 may have a filling-pip, as indicated at 5. The contiguous edges at two of the corners of the three-sided pyramid thus formed are then brought together and the rubber being unvulcanized they can be caused readily to adhere along the lines on which they meet as shown in Figure 3. The next step consists in biting or cutting off the superfluous rubber from the edges of the blank at the said two corners and pressing the edges firmly together to form sealed joints as shown in the completed blank in Figure 4. This operation is preferably accomplished by means of the cutting press shown in Figures 5-8. It will be understood that the form of the cut will depend on the final shape of the article to be made.

At this stage any suitable chemical agent, such as ammonium chloride, can be inserted for the known purpose of expanding the blank in the subsequent moulding operation. The edges at the remaining corner of the blank are then brought together and the superfluous rubber bitten or cut off and the edges pressed firmly together to form a sealed joint as previously carried out with the other edges of the blank. The completed blank as shown in Figure 4 is then obtained.

The cutting press illustrated has two opposed dies 7 and 8, each having a cutting or biting edge 9 of curved contour, as shown in Figure 7, which is bevelled inwardly or towards the blank when it is presented to the jaws so that the edges of the blank are firmly pressed together as shown in Figure 8, and the superfluous rubber beyond the jaws is spewed out or bitten off. The upper die 7 has an upstanding edge 10 at an angle to the bevel which forms with the bevel a cutting edge for this purpose. A guide-plate 11 located on the face of the lower die has a guide-edge 12. The plate is also recessed at 14 between the guide-edge 12 and the projecting piece 13. Thus, when the blank is presented to the dies with the edge of one corner thereof resting against the edge 12 and with the angle formed by that edge and the base in the recess 14, it is correctly located in relation to the cutting edges of the dies. The cut-away portion of the plate 15 allows for the superfluous rubber which is cut off the blank. It is preferred to make the bevel of the dies wider at the portion 16, which portion will operate on the apex of the blank, so that the width of the joint formed by the adherent faces of the blank will be wider at this point than at the other parts. The dies are hollowed out at 17 and 18 respectively to accommodate the body of the blank.

The top die 7 is carried on a slide 19 which is mounted on a pair of guide-rods 20 on the machine frame 21. The slide is normally held up by means of the spring 22 and is operated by means of a treadle or the like working on the rod 23.

It will be seen that with this machine each edge of the blank is bitten and pressed separately, thus a very effective sealing along the whole length of each joint and particularly at the apex of the blank is obtained.

In the manufacture of articles such as motor-horn bulbs or other incompletely closed hollow articles, a removable plug or a metal sleeve which may be intended to form a part of the finished article can be inserted at the apex of the blank at any convenient stage in the formation thereof. Such an arrangement is shown in Figure 9 where a sleeve 24 is shown inserted at the top of the blank and embraced by the corners of the triangular rubber sheet, the tips of which may be removed.

I claim:—

1. As an article of manufacture, a hollow blank for use in the making of hollow rubber articles, said blank having the form of a substantially regular tetrahedron comprising a base and three sides meeting at an apex, the width of the adherent faces of each joint at the apex being greater than the width of the adherent faces along the remainder of the joint, substantially as described.

2. A method of making hollow blanks for use in the manufacture of hollow articles of rubber, comprising the steps of erecting a hollow blank substantially in the form of a tetrahedron by manually folding a triangular sheet of unvulcanized rubber so as to bring its corners together above the central portion with contiguous marginal portions lying face to face along the corners of the pyramid, and separately attaching together the said contiguous marginal portions so that the width of the adherent faces of each joint at the apex of the blank is greater than the width of the adherent faces along the remainder of the joint, for the purpose specified.

3. A method of making hollow blanks for use in the manufacture of incompletely closed hollow articles of rubber, such as horn-bulbs or the like, comprising the steps of manually folding a triangular sheet of unvulcanized rubber so as to bring the corners thereof together over the central portion and form a pyramidal blank, providing an opening at the apex of the blank by cutting away the corners of the sheet, inserting a member in the opening, and attaching together the contiguous edges thereof, for the purpose described.

4. A method of making hollow blanks for use in the manufacture of hollow articles of rubber, comprising the steps of erecting a hollow blank of pyramidal form by manually folding a triangular piece of rubbed so as to bring its corners together over the central portion with contiguous marginal portions lying face to face along the corners of the pyramid, making an opening in the hollow blank at its apex, inserting a sleeve in said opening, attaching together each pair of contiguous marginal portions, and biting away parts of each pair of contiguous marginal portions so as to leave edges of the desired contour according to the article to be formed, substantially as described.

5. A method of making hollow blanks for use in the manufacture of hollow articles of rubber, comprising the steps of folding a sheet of unvulcanized rubber so as to form a hollow blank of pyramidal form with contiguous marginal portions of the sheet lying face to face along the corners of the pyramid, and so attaching together the said contiguous marginal portions that the width of the adherent faces of each joint at the apex of the blank is greater than the width of the adherent faces along the remainder of the joint, for the purpose described.

6. A method of making hollow blanks for use in the manufacture of hollow articles of rubber, comprising the steps of folding a triangular sheet of unvulcanized rubber so as to form a hollow blank in the form of a substantially regular tetrahedron with contiguous marginal portions of the sheet lying face to face along the corners of the hollow blank, and so attaching together the said contiguous marginal portions that the width of the adherent faces of each joint at the apex of the hollow blank is greater than the width of the adherent faces along the remainder of the joint, for the purpose described.

7. A machine for trimming pyramidal rubber blanks, comprising a single pair of press dies which have each a curved bevelled portion to enable them to press together the contiguous edges of a pyramidal blank to effect sealing of the edges, one at least of which dies is provided with a curved edge which forms, with its bevel aforesaid, a curved cutting edge to bite away the portions of the edges of the blank that are not intended to remain a part of the finished blank, which dies are so shaped as to accommodate part of the blank at the concave side of the bevelled portions and provide at said side an opening to afford access for the edge of each corner of the blank in turn for presentation separately to the dies, and form on the bitten edge a convex periphery, substantially as described.

8. A machine for trimming pyramidal rubber blanks, comprising a single pair of press dies which are bevelled to enable them to press together the contiguous edges of a pyramidal blank to effect sealing of the edges, one at least of which dies is provided with an edge which forms, with its bevel aforesaid, a cutting edge to bite away the portions of the edges of the blank that are not intended to remain a part of the finished blank, which dies are so shaped as to accommodate part of the blank and provide an opening to afford access for the edge of each corner of the blank in turn for presentation separately to the dies, and form on the bitten edge a convex periphery, and guiding means arranged to locate one edge of the blank at a time in relation to said dies, substantially as described.

9. A machine for trimming pyramidal rubber blanks, comprising two press dies which are bevelled to enable them to press together the contiguous edges of a pyramidal blank to effect sealing of the edges, one at least of which dies is provided with an edge which forms, with its bevel aforesaid, a cutting edge to bite away the portions of the edges of the blank that are not intended to remain a part of the finished blank, which dies are so shaped as to accommodate part of the blank and provide an opening to afford access for the edge of each corner of the blank in turn for presentation separately to the dies, and form on the bitten edge a convex periphery, and a guide plate carried by one of said dies and having an angular guiding edge arranged in the plane at which the dies can meet, for locating one edge at a time and the base of the blank in relation to the cutting edges of the dies, which guide plate is recessed to receive superfluous material bitten off the blank, substantially as described.

10. A machine for trimming pyramidal rubber blanks, comprising two press dies which have each a curved bevelled portion to enable them to press together the contiguous edges of a pyramidal blank to effect sealing of the edges, one at least of which dies is provided with a curved edge which forms, with its bevel aforesaid, a curved cutting edge to bite away the portions of the edges of the blank that are not intended to remain a part of the finished blank, which dies are so shaped as to accommodate part of the blank at the concave side of the bevelled portions and provide at said side an opening to afford access for the edge of each corner of the blank in turn for presentation separately to the dies, and form on the bitten edge a convex periphery, the bevel of which dies is wider at that portion of the die which will receive the apex of the blank than at the other portions, substantially as described.

In testimony whereof I affix my signature.

CHRISTIAN HAMILTON GRAY.